Figure 1:
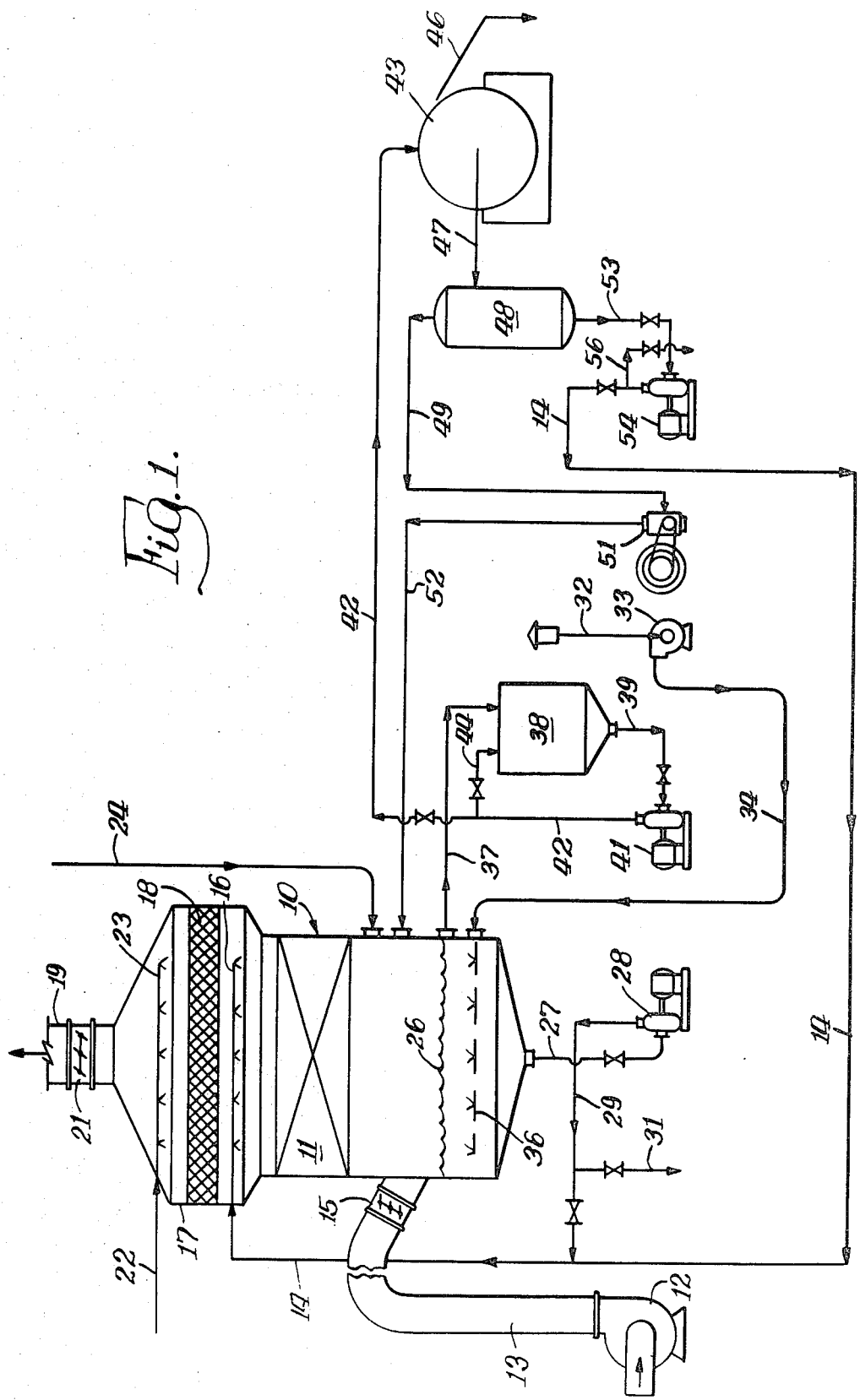

United States Patent [19]

Primack

[11] 4,374,104
[45] Feb. 15, 1983

[54] COMPOSITION AND METHOD FOR REMOVING HYDROGEN SULFIDE FROM GAS STREAM

[75] Inventor: Harold S. Primack, Skokie, Ill.

[73] Assignee: Air Resources, Inc., Palatine, Ill.

[21] Appl. No.: 192,559

[22] Filed: Sep. 30, 1980

[51] Int. Cl.$^3$ .............................................. C01B 17/04
[52] U.S. Cl. ................................ 423/226; 423/573 R; 252/351
[58] Field of Search .............. 423/226, 227, 573, 575, 423/567, 578; 252/351; 23/393 S

[56] References Cited

U.S. PATENT DOCUMENTS

| | | | |
|---|---|---|---|
| 3,077,488 | 2/1963 | Mercier et al. | 423/573 X |
| 3,097,925 | 7/1963 | Pits et al. | 423/573 |
| 3,676,356 | 7/1972 | Roberts et al. | 423/573 |
| 3,689,227 | 9/1972 | Black | 23/293 S |
| 4,189,462 | 2/1980 | Thompson | 423/226 X |
| 4,208,385 | 6/1980 | Robbins | 423/226 |

FOREIGN PATENT DOCUMENTS

| | | | |
|---|---|---|---|
| 1284160 | 2/1961 | France | 423/226 |
| 52-10857 | 1/1977 | Japan | 423/575 |
| 1136901 | 12/1968 | United Kingdom | 423/567 |

*Primary Examiner*—G. O. Peters
*Attorney, Agent, or Firm*—Merriam, Marshall & Bicknell

[57] ABSTRACT

An aqueous catalytic oxidation-reduction composition for oxidizing hydrogen sulfide to produce elemental sulfur and a method of removing hydrogen sulfide from a gas stream whereby a gas stream containing hydrogen sulfide is brought into contact with an aqueous catalytic oxidizing reaction composition containing a water soluble polyvalent metal salt having the metal in the higher valent state and at least one surfactant, preferably a low foaming nonionic surfactant, such as a linear alcohol alkoxylate surfactant, which is adapted to wet the elemental sulfur formed and having the surfactant present in the reaction solution in an amount sufficient to prevent formation of sulfur froth on the surface of the reaction solution.

25 Claims, 1 Drawing Figure

COMPOSITION AND METHOD FOR REMOVING HYDROGEN SULFIDE FROM GAS STREAM

The present invention relates generally to the removal of hydrogen sulfide gas from a fluid stream, and more particularly to an improved aqueous reaction solution useful for continuous liquid phase oxidation of hydrogen sulfide to elemental sulfur and water and to more efficient removal of the elemental sulfur from the aqueous reaction solution.

The removal of hydrogen sulfide from a fluid stream by liquid phase oxidation is old in the art (See U.S. Pat. Nos. 3,097,925, 3,676,356, 4,009,251, 4,036,941, 4,189,462 and British Pat. No. 948,270) and in general comprises bringing a hydrogen sulfide gas containing stream into intimate contact with an aqueous oxidizing reaction solution, preferably comprising an aqueous oxidizing solution containing polyvalent metal ions (M) as a catalyst which transfers electrons to the sulfide ion in aqueous solution to form elemental sulfur while reducing the metal ions from their higher valence state to a lower valence state, as illustrated by the following equation:

$$S^{=} + 2M^{+3} \rightarrow S^{\circ} + 2M^{+2}$$

In order to regenerate the catalytic metal ions to their original higher valence state the reduced reaction solution is contacted with oxygen dissolved in the aqueous reaction solution, as illustrated by the following equation:

$$1/2 O_2 + 2M^{+2} + H_2O \rightarrow 2(OH)^{-} + 2M^{+3}$$

Among the polyvalent metals which can be used in the aqueous reaction solution in ionic form are iron, copper, vanadium, manganese, platinum, tungsten, nickel, mercury, tin and lead, with iron being preferred.

In order to provide an economical workable continuous process for removing hydrogen sulfide gas from a fluid stream in which polyvalent metal ions are used to effect catalytic oxidation of hydrogen sulfide, it is desirable to provide an aqueous catalytic reaction solution which is stable at slightly acidic and alkaline pH values over a relatively wide pH range (preferably from about pH 5.5 to pH 13) and which is capable of being rapidly regenerated after effecting oxidation of the hydrogen sulfide without significant loss of the catalytic metal ions and sulfur while avoiding an objectionable build-up of elemental sulfur in the reaction solution. While certain aqueous oxidizing reaction solution containing a polyvalent metal catalysts such as vanadium in the Stretford process are relatively stable, other aqueous reaction solutions which contain a metal catalyst such as iron must be stabilized against precipitation of metal hydroxides and metal sulfides by including in the reaction solution a chelating agent which maintains the metal catalyst in solution in both its higher and lower valence states in alkaline solution and preferably over a pH range from about 5.5 to about 13.

The continuous oxidation of hydrogen sulfide ($H_2S$) to form elemental sulfur ($S^{\circ}$) by a chelated aqueous catalytic metal oxidation-reduction reaction solution and the regeneration of the reduced aqueous catalytic metal reaction solution can be represented by the following equations:

(1) Oxidation-Reduction:

$$H_2S(gas) + 2(M\ Chelate)^{+3} \xrightarrow[(aqueous)]{} 2H^{+} + S^{\circ} + 2(M\ Chelate)^{+2}$$

(2) Regeneration:

$$\tfrac{1}{2}O_2(gas) + 2(M\ Chelate)^{+2} \xrightarrow[(aqueous)]{} 2(OH)^{-} + 2(M\ Chelate)^{+3}$$

While it is desirable to maintain a minimum concentration of between about 0.1 wt. percent and 10 wt. percent sulfur in the reaction solution in order to increase the overall size of the sulfur particles in the reaction solution, a sulfur concentration in excess of about 10 percent by wt. results in plugging of equipment and interferes with the catalytic reactions. One of the most economical means for reducing the concentration of elemental sulfur in the reaction solution is to cause the sulfur to settle out of the reaction solution. However, because the elemental sulfur is formed while rapidly mixing a large volume of hydrogen sulfide containing gas with a large body of aqueous reaction solution, a gas-liquid-solid sulfur dispersion is formed as a result of a large volume of gas moving at a relatively high velocity relative to a liquid reaction solution, and extremely fine solid elemental sulfur particles are formed in the reaction solution having surface properties which cause the particles to adhere to minute gas bubbles in the aqueous reaction solution and float to the surface where they form a thick layer of froth on the surface of the reaction solution, thereby preventing rapid and complete settling and recovery of the sulfur from the reaction solution.

It is therefore an object of the present invention to provide an improved aqueous liquid phase oxidizing solution from which elemental sulfur formed therein can be more efficiently removed.

It is also an object of the present invention to provide a substantially greater concentration of sulfur in the solution withdrawn from the reaction zone than has heretofore been achieved.

It is a further object of the present invention to provide an improved aqueous metallic chelated oxidation-reduction reaction solution adapted for liquid phase oxidation of hydrogen sulfide gas to form elemental sulfur wherein the sulfur does not remain suspended in the reaction solution for a prolonged period or float to the surface and form a layer of froth on the surface of the reaction solution.

It is still another object of the present invention to provide a more economical process for the removal of hydrogen sulfide gas from a fluid stream and recovery of elemental sulfur from a catalytic liquid phase oxidizing aqueous solution.

Other objects of the present invention will be apparent from the accompanying detailed description and claim to follow.

The foregoing objects of the present invention are achieved by incorporating in an aqueous catalytic oxidizing reaction solution an effective amount of one or more surfactants compatible with the catalytic aqueous phase oxidizing reaction solution which thoroughly wets the surface of the particles of elemental sulfur formed when the said aqueous reaction solution is brought into intimate contact with a hydrogen sulfide containing gas stream so that the particles of elemental sulfur do not remain suspended in the reaction solution for a prolonged period or float to the surface and form a layer of a sulfur froth on the surface of the reaction solution.

While any surfactant can be used which effectively wets the sulfur particles and which is stable in an alkaline reaction solution (and preferably stable over a pH range of from about 5.5 to 13), the surfactants which preferably are used in the present process for wetting the particles of elemental sulfur formed in the reaction solution and for preventing froth forming on the surface of the reaction solution are the low foaming nonionic surfactants or wetting agents which can be prepared by treating a higher linear alcohol or carboxylic acid or a phenolic compound with ethylene oxide or a like alkoxide. More particularly, the preferred linear alcohol ethoxylate surfactants are produced by treating a linear or aliphatic alcohol having from about 11 to 15 carbon atoms with sufficient ethylene oxide to form a chain having from about 5 to as high as 15 or more ethoxy units. The latter low foaming aliphatic alcohol ethoxylates are sold under the tradename "Polytergent S-205LF", "Polytergent S-305LF" and "Polytergent S-405LF" by Olin Chemicals, Stamford, Conn. The nonionic low foaming "Polytergent SLF-18" is also useful in the present process.

Nonionic surfactants of the class comprising ethoxylated alkyl phenols having from about 8 to 18 carbon atom in the alkyl group (such as nonylphenoxy polyether alcohols) and containing from about 6 to 100 ethylene oxide groups are also effective for wetting the sulfur formed in the oxidation-reduction reaction solution and for preventing sulfur froth forming on the surface of the reaction solution. Among the latter group of surfactants are "Polytergent B-350" and "Polytergent B-300" sold by Olin Chemicals. Generally, the latter nonionic surfactants require use of an antifoaming agent in combination therewith in order to control the formation of foam. Example of a suitable anti-foaming agent are Dow Corning Antifoam B and Dow Corning Antifoam B31 or other foam killing oil. Other nonionic surfactants useful for effecting more efficient separation of elemental sulfur from the reaction solution are acetylenic diols, such as 2,4,7,9-tetramethyl 1–5 decyne-4,7-diol, Surfynol TG (sold by Air Products and Chemical Co.) and polyethylene oxide adducts of polypropylene oxide.

The cationic surfactants, such as the quaternary amine surfactants, can also be used to prevent sulfur froth forming on the surface of the reaction solution. Examples of the latter group of surfactants are n-alkyl dimethyl benzyl ammonium chloride and n-alkyl dimethyl ethyl benzyl ammonium chloride sold under the tradename BTC-2125M (Onyx Chemical Co.), but like the immediately preceding group of nonionic surfactants, the latter generally requires the use of an antifoaming agent and are less desirable.

Anionic surfactants which may be used in combination with an antifoaming agent are linear sodium alkyl aryl sulfonate, linear alkyl sulfate (LAS), linear alkyl ethoxy sulfate and sulfosuccinate surfactants. Anionic surfactants are not to be used in combination with cationic surfactants.

The catalytic iron oxidation-reduction reaction solutions of the present invention are prepared by dissolving a suitable iron salt in water and adding the required amounts of one or more of the herein disclosed surfactants. To this aqueous solution alkaline material is then added to provide a concentrate which can be diluted with water as required to obtain the operating solution having the desired pH and iron content.

For efficient and economical operation, the amount of surfactants or wetting agent used in the operating reaction solution should be no greater than required to thoroughly wet the particles of elemental sulfur formed in the reaction solution as indicated by the absence of the formation of sulfur froth on the surface of the reaction solution. It has been found that the amount of surfactant required in the reaction solution for efficient operation ranges between about 5 ppm to 100 ppm by weight surfactant.

The iron salt used in preparing the concentrate is preferably a ferric salt, such as ferric chloride, ferric sulfate, or ferric nitrate. However, it is also possible to use a ferrous salt, such as ferrous sulfate, but in this case the solution must be aerated prior to use in order to insure oxidation of the iron to the ferric state. The alkaline material used to adjust the reaction solution to an alkaline pH is preferably sodium carbonate or sodium hydroxide or mixtures thereof, although other alkaline compounds which do not adversely effect the reaction solution can be used.

The iron content of the dilute operating reaction solution can vary over a wide range, dependent upon the gas being treated and other factors. Operating reaction solutions having an iron content of from about 5 ppm to about 5000 ppm can be used, with 200 ppm to 2000 ppm being preferred. It has been observed that when a polyamine chelated iron is used in high concentration (i.e. above 5000 ppm), objectionably high losses of the polyamino chelating agent, such as EDTA, occur. Using a polyhydroxy type chelating agent of the type disclosed herein in combination with the amino chelating agent substantially reduces the loss of iron. In preparing the concentrate it is desirable always to add both the polyamino and polyhydroxy type chelating agents before the alkaline agent so as to avoid precipitation of iron. The presence of the two types of chelating agents improves the stability of the reaction solution so that no great care is required in making up the dilute final reaction solution (See Thompson U.S. Pat. No. 4,189,462).

Among the chelating agents which can be used to stabilize the catalytic agents which can be used to stabilize the catalytic metal ions, such as ferric ions and ferrous ions, in an aqueous oxidation-reduction reaction solution are polyamino-, polyamino alkyl- and polyamino hydroxyalkyl polycarboxylic acids such as amino acetic acids and their alkali metal salts derived from ethylenediamine, diethylenetriamine, 1,2-propylenediamine, and 1,3-propylenediamine, including ethylenediamine tetraacetic acid (EDTA), 2-hydroxy ethylethylenediamine triacetic acid (HEDTA), diethylenetriamine pentaacetic acid, N-hydroxyethyl ethylenediamine triacetic acid, and the trisodium salt of N-hydroxyethyl ethylene diamine triacetic acid ($Na_3$-HEDTA); acetic acid derivatives of cyclic 1,2-diamines, such as 1,2-diaminocyclohexane-N,N-tetraacetic acid, and 1,2-phenylenediamine-N,N-tetraacetic acid, the amides of polyamino acetic acids (See U.S. Pat. No. 3,580,950) and polyhydroxy chelating agents, such as the sugars, the sugar acids or the reduced sugars, including both monosaccharides and polysaccharides. Examples of suitable polysaccharide sugars are the disaccharides, such as sucrose, lactose, and maltose, and examples of the monosaccharides are glucose and fructose. Suitable sugar acids include the disaccharide sugar acids and monosaccharide sugar acids, such as gluconic acid and glucoheptanoic acid, which may be used in the form of their alkali metal salts particularly sodium salts. However, the reduced sugars are preferred to other mono and polysaccharide chelating agent, since there is no possibility of hydrolysis or oxidation at a potential aldehyde group. Examples of suitable reduced sugars are the reduced monosaccharides and reduced disaccharides, including sorbitol and mannitol. The polyhydroxy chelating agents can be used in combination with one or more of the other chelating agents (See U.S. Pat. No. 4,189,462).

Various methods can be used to effect the required intimate contact between the hydrogen sulfide containing gas and the aqueous reaction solution. The type of process flow best suited for the catalytic oxidation reduction system using a catalytic iron oxidizing solution in the present invention will depend upon the hydrogen sulfide content of the gas stream being treated and the nature of the other components of the gas stream. FIG. 1 illustrates a process flow in which the oxidation of hydrogen sulfide and the regeneration of a chelated iron oxidizing solution are carried out concurrently in the same reaction vessel, this arrangement being referred to herein as aerobic absorption processing or aerobic operation. However, the oxidation of hydrogen sulfide can be carried out in one chamber and the regeneration of the solution in a separate chamber, if desired. The process flow of FIG. 1 is particularly adapted for use in treating a waste gas stream containing a relatively low concentration of hydrogen sulfide (e.g. 500 ppm or less) and which has a relatively high concentraton of oxygen (e.g. 20% by vol.), such as contaminated ventilating air, the off-gas from a xanthate plant producing rayon or cellophane, or gas from a sewage plant.

Referring to FIG. 1, the catalytic oxidation-reduction reaction system comprises an absorption tower or scrubber 10 containing a central contact zone illustrated schematically at 11. This zone may be a simple spray chamber or may comprise any suitable liquid-vapor contacting means such as the conventional packed beds, plates or trays. The inlet gas containing hydrogen sulfide is introduced into the tower 10 through a blower 12 and a conduit 13 below the contact zone 11 for passage upwardly therethrough. A flow control damper 15 is provided in the conduit 13. The chelated iron solution of the present invention is supplied by a line 14 to sprays or distribution nozzles 16 located in an enlarged upper section 17 of the tower 10 and passes downwardly through the contact zone 11 in countercurrent relation to the upwardly flowing gas stream. The treated gas exits from the tower 10 through a demister zone 18 in the section 17 and an outlet 19 having a flow control damper 21. Make-up water may be added to the system, as required, through a line 22 communicating with sprays 23 located above the demister zone 18. In the alternate, the water used to wash the sulfur filter cake can be returned to the system as make-up water. Make-up chelated iron solution may be added, as required, through a line 24 communicating with the tower 10 below the contact zone 11.

In the arrangement illustrated in FIG. 1 the bottom portion of the absorption tower 10 is used as a reservoir for the chelated iron solution which fills the bottom of the tower to a level, indicated at 26, below the point of introduction of gas through the conduit 13. The chelated iron solution is continuously recirculated from the bottom of the tower 10 to the nozzles 16 through a line 27, a pump 28, and a line 29 connected to the line 14. A portion of the chelated iron solution may be bled from the system through a line 31, as may be required.

When treating gases having a low concentration of hydrogen sulfide and where the gas stream contains a relatively high concentration of oxygen, it is not necessary to introduce an additional oxygen containing gas stream into the tower 10 to effect regeneration of the solution, but when treating gases containing more than about 1000 ppm hydrogen sulfide, regeneration of the chelated iron solution is effected by drawing atmospheric air through a screened inlet 32 by a blower 33, and the air is supplied through a line 34 to nozzles 36 disposed in the lower portion of the tower 10 so that the air is bubbled through the volume of solution in the bottom of the tower 10, thereby thoroughly aerating the solution and oxidizing the ferrous iron to ferric iron. The effluent air passes upwardly through the tower 10 along with the feed gas and exits with the treated gas through the outlet 19.

In the contact zone 11 the hydrogen sulfide in the inlet gas is oxidized to elemental sulfur by the chelated iron solution, as heretofore described. The sulfur solids formed are present as a slurry in the treating solution in the bottom of the tower 10. A portion of this slurry is continuously withdrawn from the tower 10 through a line 37 to a slurry tank 38. The sulfur slurry is withdrawn from the slurry tank 38 through a line 39 by a pump 41 and is carried through a line 42 to a filtration step in this case a continuous drum filter 43. A portion of the sulfur slurry supernatant may be recirculated to the tank 38 through a line 44.

The following examples will serve to illustrate the invention but are not to be construed as limiting the invention:

EXAMPLE I

A chelated iron concentrate was prepared as described herein using a concentrated aqueous solution of $Na_4EDTA$ (Versene 100) and a concentrated aqueous solution of $Na_3HEDTA$ (Versenol 120) and sorbitol. The composition of the concentrate was as follows on a weight percent basis:

| | |
|---|---|
| Water | 55.9% |
| $FeCl_3$ (39 wt. % aqueous solution) | 13.4 |
| Versene Powder ($Na_4EDTA$) | 6.3 |
| Versenol 120 (41 wt. % aqueous solution $Na_3HEDTA$) | 6.3 |
| Sorbitol (70 wt. % aqueous solution) | 6.3 |
| NaOH (50 wt. % aqueous solution) | 3.6 |
| $Na_2CO_3$ | 8.2 |
| | 100.0% |

EXAMPLE II

The concentrate of Example I was diluted with sufficient water to provide a 6300 gallon reaction solution containing 500 ppm iron. The pH of the solution was maintained within the range of from about 8.5 to about 9.5. The gas treated was an off-gas from a metallurgical process having a hydrogen sulfide content which yielded 30 lbs. sulfur per hour. Sulfur froth was a persistant problem and the froth layer on the surface of the reaction solution was often several feet thick. The addition of 250 ml of the nonionic low foaming linear alcohol ethoxylate "Polytergent S-205LF" (10 ppm by wt.) immediately caused the froth which was approximately 1 ft. deep at the time to begin collapsing and eliminated the froth layer.

EXAMPLE III

A hydrogen sulfide oxidation process using the concentrate of Example I was used to remove about 12 to 18 lb/hr of hydrogen sulfide from a gas stream containing primarily propane and butanes had problems with sulfur being carried over from the absorber into the product gas. It was determined that this was due to a layer of sulfur froth which formed on the surface of the catalyst solution.

Addition of 1.4 gallons of the nonionic low foaming surfactant Polytergent S-205LF to the system (equivalent to 100 ppm by weight) halted the formation of sulfur froth and sulfur carryover, thereby greatly improved the quality of the product gas. Intermittent addition of 3 to 8 pints/day of Polytergent S-205LF for the remainder of the 5 day run prevented sulfur froth formation and sulfur carryover.

EXAMPLE IV

An 18 day test was conducted on a hydrogen sulfide Oxidation System containing 1500 ml of a solution of the concentrate of Example I in water (Iron concentration varied from 300 ppm to 1580 ppm). An average of 6.4 grams of sulfur were produced each day in the system.

By the third day of operation, a layer of sulfur froth 2 cm thick had formed on the surface of the solution. One milliliter of a solution containing 1 ml Polytergent S-205LF in 99 ml isopropanol was added to the catalyst solution and within 10 seconds all of the sulfur froth was wetted.

Froth did not form again until the third week of operation. Again, the addition of 1 ml of the wetting agent solution brought it under control.

In a manner similar to Example IV nonyl phenoxy polyether alcohol (Polytergent B-350), 2,4,7,9-tetramethyl-5 decyne-4,7-diol (Surfynol), and dimethyl ethyl benzyl ammonium chloride was added to the aqueous reaction solution of Example IV. No stable froth developed when hydrogen sulfide gas was passed through the solution.

I claim:

1. A catalytic oxidation-reduction composition for oxidizing hydrogen sulfide to form elemental sulfur in an aqueous alkaline reaction solution comprising an aqueous solution containing a chelated water soluble polyvalent metal catalyst having the metal in its higher valence state and containing at least one water soluble surfactant stable in said alkaline solution which is adapted to wet said elemental sulfur formed in said reaction solution and effect settling sulfur from said solution, and said surfactant being present in the aqueous solution in an amount sufficient to prevent the formation of a layer of sulfur froth on the surface of said reaction solution while maintaining the sulfur concentration in said reaction solution between about 0.1 wt. % and 10 wt. %.

2. A composition as in claim 1, wherein said surfactant is a nonionic wetting agent.

3. A composition as in claim 2, wherein said nonionic wetting agent is a linear alcohol alkoxylate wetting agent.

4. A composition as in claim 2, wherein said nonionic wetting agent is an ethoxylated alkyl phenol wetting agent.

5. A composition as in claim 2, wherein said nonionic wetting agent is an acetylenic diol wetting agent.

6. A composition as in claim 2, wherein said nonionic wetting agent is a complex polymer of ethylene oxide, propylene oxide and alcohol.

7. A composition as in claim 1, wherein said surfactant is a cationic wetting agent.

8. A composition as in claim 7, wherein said cationic wetting agent is an n-alkyl dimethyl benzyl ammonium chloride wetting agent.

9. A composition as in claim 1, wherein said surfactant is an anionic wetting agent.

10. A composition as in claim 9, wherein said surfactant is a linear sodium alkyl aryl sulfonate wetting agent.

11. A composition as in claim 1, wherein said polyvalent metal catalyst is chelated by a polyvalent metal chelating agent.

12. A composition as in claim 11, wherein said chelating agent comprises a mixture of at least one water soluble iron chelating agent selected from the group of amines consisting of polyamino polycarboxylic acids, polyamino alkyl polycarboxylic acids, polyamino hydroxyalkyl polycarboxylic acids, and poly(phosphonoalkyl) amines, and their alkali metal salts, and at least one water soluble iron chelating agent selected from the group of polyhydroxy compounds consisting of monosaccharides, disaccharides, reduced monosaccharides, reduced disaccharides, monosaccharide acids, and disaccharide acids, and their alkali metal salts, and said reaction solution contains at least one surfactant adapted to wet said sulfur formed in said reaction solution with said surfactant being present in the solution in an amount sufficient to prevent the formation of a layer of sulfur froth on the surface of said reaction solution.

13. A composition as in claim 12, wherein said surfactants is a nonionic low foaming wetting agent.

14. A composition as in claim 13, wherein said nonionic low foaming wetting agent is a linear alcohol alkoxylate wetting agent.

15. In a process of removing hydrogen sulfide gas from a fluid stream by contacting said stream in a reaction zone with an aqueous catalytic oxidation-reduction reaction solution containing a chelated water soluble polyvalent metal catalyst which effects oxidation of said hydrogen sulfide to form elemental sulfur the improvement comprising; incorporating in said aqueous catalytic oxidation-reduction reaction solution at least one surfactant adapted to wet said sulfur formed in said reaction solution and effect settling sulfur from said solution with said surfactant being present in the solution in an amount sufficient to prevent the formation of a layer of sulfur froth on the surface of said reaction solution while maintaining the sulfur concentration in said reaction solution between about 0.1 wt. % and 10 wt. %, and withdrawing said sulfur as a slurry from the bottom of said reaction zone.

16. A process as in claim 15, wherein said surfactant is a nonionic low foaming wetting agent.

17. A process as in claim 16, wherein said nonionic low foaming wetting agent is a linear alcohol alkoxylate wetting agent.

18. A process as in claim 15, wherein said surfactant is a cationic wetting agent.

19. A process as in claim 15, wherein said metal catalyst is a water soluble iron salt chelated with at least one water soluble iron chelating agent selected from the group of amines consisting of polyamino polycarboxylic acids, polyamino alkyl polycarboxylic acids, polyamino hydroxyalkly polycarboxylic acids, and poly(phosphonoalkyl) amines, and their alkali metal salts, and at least one water soluble iron chelating agent selected from the group of polyhydroxy compounds consisting of monosaccharides, disaccharides, reduced monosaccharides, reduced disaccharides, monosaccharide acids, and disaccharide acids, and their alkali metal salts.

20. A process as in claim 19, wherein said surfactant is a nonionic low foaming ethoxylated linear alcohol wetting agent.

21. A composition as in claim 7, wherein said cationic wetting agent is an n-alkyl dimethyl aryl benzyl ammonium chloride wetting agent.

22. A process as in claim 18, wherein said cationic wetting agent is an n-alkyl dimethyl benzyl ammonium chloride wetting agent.

23. A process as in claim 18, wherein said cationic wetting agent is an n-alkyl dimethyl ethyl benzyl ammonium chloride wetting agent.

24. A process as in claim 15, wherein said surfactant is an anionic wetting agent.

25. A process as in claim 24, wherein said anionic wetting agent is a linear sodium alkyl aryl sulfonate wetting agent.

* * * * *